United States Patent
Shimomura et al.

(10) Patent No.: US 8,176,730 B2
(45) Date of Patent: May 15, 2012

(54) EXHAUST GAS PURIFICATION DEVICE OF INTERNAL COMBUSTION ENGINE

(75) Inventors: Osamu Shimomura, Okazaki (JP); Masakazu Sakata, Obu (JP); Masatoshi Maruyama, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 301 days.

(21) Appl. No.: 12/476,563

(22) Filed: Jun. 2, 2009

(65) Prior Publication Data

US 2009/0293459 A1 Dec. 3, 2009

(30) Foreign Application Priority Data

Jun. 3, 2008 (JP) ................................ 2008-146086

(51) Int. Cl.
*F01N 3/00* (2006.01)
(52) U.S. Cl. ........................................... 60/295; 60/301
(58) Field of Classification Search .................... 60/286, 60/287, 295, 301, 303
See application file for complete search history.

(56) References Cited

U.S. PATENT DOCUMENTS

| | | | |
|---|---|---|---|
| 6,311,480 B1 * | 11/2001 | Suzuki et al. | 60/276 |
| 6,951,098 B2 * | 10/2005 | Xu et al. | 60/286 |
| 2003/0182935 A1 | 10/2003 | Kawai et al. | |
| 2005/0034450 A1 | 2/2005 | Itoh et al. | |
| 2005/0204729 A1 | 9/2005 | Itoh et al. | |
| 2005/0217248 A1 | 10/2005 | Itoh et al. | |
| 2005/0217249 A1 | 10/2005 | Itoh et al. | |
| 2005/0262829 A1 | 12/2005 | Itoh et al. | |
| 2005/0262832 A1 | 12/2005 | Itoh et al. | |

FOREIGN PATENT DOCUMENTS

| | | | |
|---|---|---|---|
| DE | 10 2006 009 935 | | 9/2007 |
| JP | 2001-027113 | | 1/2001 |
| JP | 2001027113 A | * | 1/2001 |
| JP | 2003-286828 | | 10/2003 |
| JP | 2003-293738 | | 10/2003 |
| JP | 2003-293739 | | 10/2003 |
| JP | 2003-293743 | | 10/2003 |
| JP | 2005-127256 | | 5/2005 |
| JP | 2005127256 A | * | 5/2005 |

OTHER PUBLICATIONS

Japanese Office Action dated Apr. 27, 2010, issued in corresponding Japanese Application No. 2008-146086, with English translation.
German Office Action dated Oct. 5, 2010, issued in corresponding German Application No. 10 2009 026 510.4-13, with English translation.

* cited by examiner

*Primary Examiner* — Thomas Denion
*Assistant Examiner* — Patrick Maines
(74) *Attorney, Agent, or Firm* — Nixon & Vanderhye P.C.

(57) ABSTRACT

An SCR catalyst is provided in an exhaust pipe of an engine and a urea solution addition valve is provided upstream of the SCR catalyst in the exhaust pipe. An ECU calculates ammonia adsorption quantity of the SCR catalyst and controls urea solution addition quantity, which is added by the urea solution addition valve, based on the ammonia adsorption quantity. The ECU obtains temperature of the SCR catalyst or temperature information correlated with the temperature through measurement or estimation. The ECU switches an execution mode of the urea solution addition control based on the catalyst temperature or the temperature information. Thus, reducing agent addition control can be performed suitably and eventually NOx purification in a NOx catalyst (i.e., SCR catalyst) can be performed suitably.

16 Claims, 8 Drawing Sheets

EXHAUST GAS PURIFICATION DEVICE OF INTERNAL COMBUSTION ENGINE

CROSS REFERENCE TO RELATED APPLICATION

This application is based on and incorporates herein by reference Japanese Patent Application No. 2008-146086 filed on Jun. 3, 2008.

BACKGROUND OF THE INVENTION

1. Field of the Invention

The present invention relates to an exhaust gas purification device of an internal combustion engine. In particular, the present invention is suitably applied to an exhaust gas purification system that uses selective catalytic reduction (SCR) for selectively purifying NOx (nitrogen oxides) in exhaust gas by using ammonia as a reducing agent. The above system is known as a urea SCR system since urea aqueous solution is generally used as the reducing agent.

2. Description of Related Art

In recent years, a urea SCR system has been developed and partly adopted in practical use as an exhaust gas purification system that purifies NOx in exhaust gas at a high purification rate in an engine (specifically, a diesel engine) applied to an automobile or the like. A following construction is known as the urea SCR system. That is, in the urea SCR system, a selective reduction NOx catalyst is provided to an exhaust pipe connected to an engine main body, and a urea solution addition valve for adding urea solution (urea aqueous solution) as a NOx reducing agent into the exhaust pipe is provided upstream of the NOx catalyst.

In the above-described system, the urea solution is added into the exhaust pipe by the urea solution addition valve, so NOx in the exhaust gas are selectively reduced and removed on the NOx catalyst. Concerning the reduction of NOx, ammonia (NH3) is generated when the urea solution is hydrolyzed with exhaust heat. The ammonia adsorbs to the NOx catalyst, and a reduction reaction based on the ammonia occurs on the NOx catalyst. Thus, NOx are reduced and purified.

In order to increase a NOx purification rate in the NOx catalyst and to inhibit occurrence of ammonia slip at the same time, it is necessary to supply just enough ammonia to the NOx catalyst. Therefore, there is a proposed technology that estimates ammonia adsorption quantity in a NOx catalyst (i.e., reducing agent adsorption quantity) and that controls urea solution addition quantity of a urea solution addition valve based on the estimate (for example, as described in Patent document 1: JP-A-2003-293737 or Patent document 2: JP-A-2003-293738). More specifically, NOx discharge quantity discharged from the engine and an actual NOx purification rate in the NOx catalyst are calculated. Ammonia consumption quantity in the NOx catalyst is calculated based on the NOx discharge quantity and the actual NOx purification rate. The ammonia adsorption quantity is calculated based on the ammonia consumption quantity and the urea solution addition quantity at the time. The urea solution addition quantity is controlled in accordance with the ammonia adsorption quantity.

It is difficult to directly measure the ammonia adsorption quantity in the NOx catalyst. Therefore, generally, technologies including the above-described conventional technologies employ a construction estimating the ammonia adsorption quantity from a measurement value of a NOx sensor or the like provided in the exhaust pipe.

However, it is thought that the calculation accuracy of the ammonia adsorption quantity falls if the NOx catalyst is brought to a predetermined high temperature state due to temperature increase. That is, it is thought that the limit value of the ammonia adsorption quantity in the NOx catalyst varies in accordance with the catalyst temperature. When the limit value of the ammonia adsorption quantity is small, the ammonia slip tends to occur. Under a condition where the ammonia slip tends to occur, correct calculation of the ammonia adsorption quantity is difficult. Accordingly, there is a concern that the accuracy of the urea solution addition control falls and eventually the NOx purification rate falls.

SUMMARY OF THE INVENTION

It is an object of the present invention to provide an exhaust gas purification device of an internal combustion engine capable of performing reducing agent addition control suitably and of eventually performing NOx purification in a NOx catalyst suitably.

According to a first example aspect of the present invention, an exhaust gas purification device of an internal combustion engine is applied to an exhaust gas purification system that has a NOx catalyst (SCR catalyst) provided in an exhaust passage of the internal combustion engine for adsorbing a reducing agent and for selectively purifying NOx in exhaust gas with the reducing agent and that adds the reducing agent upstream of the NOx catalyst with respect to a flow direction of the exhaust gas by using a reducing agent adding device. The exhaust gas purification device calculates reducing agent adsorption quantity in the NOx catalyst and controls reducing agent addition quantity, which is added by the reducing agent adding device, based on the reducing agent adsorption quantity. The exhaust gas purification device has an obtaining device for obtaining temperature of the NOx catalyst or temperature information correlated with the temperature of the NOx catalyst through measurement or estimation. The exhaust gas purification device has a control switching device for switching an execution mode of the reducing agent addition control based on the catalyst temperature or the temperature information obtained by the obtaining device. The reducing agent adsorption quantity may be calculated based on a balance between supply and consumption of the reducing agent in the NOx catalyst.

Figure 4:
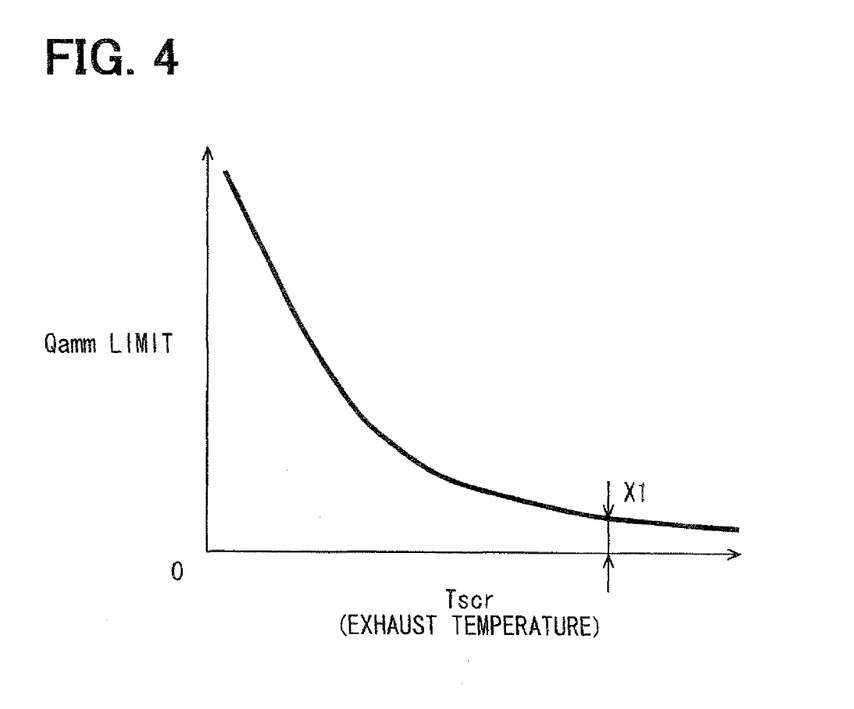
FIG. 4 is a diagram showing a relationship between catalyst temperature and a limit value of ammonia adsorption quantity.

In short, in the NOx catalyst, the limit value of the reducing agent adsorption quantity varies in accordance with the catalyst temperature. A general relationship therebetween is shown in FIG. 4. That is, the limit value of the reducing agent adsorption quantity (Qamm in FIG. 4) decreases as the catalyst temperature (Tscr in FIG. 4) increases. Therefore, when the NOx catalyst is in the high temperature state, the reducing agent supplied to the NOx catalyst tends to become excessive. If the reducing agent becomes excessive, the reducing agent is discharged downstream of the NOx catalyst (that is, ammonia slip occurs). It is thought that appropriate management of the reducing agent adsorption quantity is difficult and the reducing agent addition control based on the reducing agent adsorption quantity cannot be performed suitably in such the case, i.e., if the NOx catalyst is in the high temperature state.

In this regard, according to the above aspect of the present invention, the execution mode of the reducing agent addition control is switched based on the NOx catalyst temperature (or the temperature information). Therefore, the reducing agent addition control can be performed suitably even when the appropriate management of the reducing agent adsorption quantity is difficult because of the increase of the NOx catalyst temperature. As a result, the NOx purification in the NOx catalyst can be performed suitably.

According to a second example aspect of the present invention, the control switching device stops the addition quantity control based on the reducing agent adsorption quantity in a case where the catalyst temperature obtained by the obtaining device at each time is higher than a predetermined value or in an equivalent case. When the NOx catalyst temperature is high, the NOx quantity is large as compared to the quantity of the reducing agent that can adsorb to the NOx catalyst and the time of the NOx purification reaction is short. Therefore, there is no need to particularly consider the reducing agent adsorption quantity. The NOx purification rate can be maintained even if the reducing agent addition control is performed without considering the reducing agent adsorption quantity.

When the NOx catalyst is in the high temperature state, the execution mode of the control should be preferably changed as in following construction (1) or (2). In either case, appropriate reducing agent addition control can be performed when the NOx catalyst is in the high temperature state.

(1) According to a third example aspect of the present invention, the exhaust gas purification device further has a basic value calculating device and a correction value calculating device. The basic value calculating device calculates a basic value of the reducing agent addition quantity, which is added by the reducing agent adding device, based on NOx quantity introduced into the NOx catalyst at each time. The correction value calculating device calculates a correction value of the reducing agent addition quantity, which is added by the reducing agent adding device, based on the reducing agent adsorption quantity of each time. The control switching device performs the addition quantity control based on an addition quantity control value calculated from the basic value and the correction value of the reducing agent addition quantity in a case where the catalyst temperature is lower than a predetermined value or in an equivalent case. The control switching device performs the addition quantity control based on an addition quantity control value calculated from the basic value (i.e., the addition quantity control value calculated not using the correction value) in a case where the catalyst temperature is higher than a predetermined value or in an equivalent case.

(2) According to a fourth example aspect of the present invention, the exhaust gas purification device further has a purification rate calculating device and a controlling device. The purification rate calculating device calculates a NOx purification rate in the NOx catalyst. The controlling device controls the reducing agent addition quantity, which is added by the reducing agent adding device, based on the calculated value of the NOx purification rate of each time. The control switching device switches from the addition quantity control based on the reducing agent adsorption quantity to the addition quantity control based on the NOx purification rate in a case where the catalyst temperature is higher than a predetermined value or in an equivalent case.

According to a fifth example aspect of the present invention, the control switching device switches the reducing agent addition control between first control performed based on the reducing agent adsorption quantity and second control performed not based on the reducing agent adsorption quantity. Hysteresis is provided between a catalyst temperature threshold value in the case of switching from the first control to the second control and a catalyst temperature threshold value in the case of switching from the second control to the first control.

By setting the hysteresis in this way, frequency of the control switching between the first control and the second control can be reduced. The temperature range where the control switching is performed (i.e., a predetermined temperature range including the catalyst temperature threshold value) is the range where the accuracy of the addition quantity control based on the reducing agent adsorption quantity tends to fall. The fall of the control accuracy can be inhibited by reducing the frequency of the control switching in such the temperature range.

For example, after the addition quantity control based on the reducing agent adsorption quantity (i.e., the first control) is stopped because the catalyst temperature becomes the high temperature, the timing of resumption of the same addition quantity control (the first control) can be delayed. Thus, the accuracy of the addition quantity control can be improved at the timing of the resumption of the addition quantity control based on the reducing agent adsorption quantity.

According to a sixth example aspect of the present invention, the exhaust gas purification device performs feedback control of the reducing agent addition quantity to conform the reducing agent adsorption quantity, which is calculated at each time, to a target value. The control switching device changes at least one of a gain of the feedback control and an upper limit of a feedback amount of the feedback control based on the catalyst temperature or the temperature information obtained by the obtaining device at each time. For example, when the NOx catalyst temperature is the high temperature, the gain is changed to a small value or the upper limit of the feedback amount is changed to a small value based on the catalyst temperature at the time.

By changing the feedback gain or the upper limit of the feedback amount in this way, performance of the control to follow the target value can be changed suitably when the catalyst temperature becomes high in the construction that stops the addition quantity control based on the reducing agent adsorption quantity when the catalyst temperature becomes high, for example. Therefore, in the construction that switches between the stoppage and the resumption of the addition quantity control based on the reducing agent adsorption quantity, the switching can be performed smoothly.

There is a correlation between the operation load of the internal combustion engine and the temperature of the NOx catalyst. For example, when the operation load of the internal combustion engine is high (i.e., during a high-load period), the catalyst temperature rises because the exhaust gas temperature rises. Therefore, according to a seventh example aspect of the present invention, the obtaining device obtains load information of the internal combustion engine as the temperature information of the NOx catalyst. The control switching device switches the execution mode of the reducing agent addition control based on the load information of the internal combustion engine of each time. Also with such the construction, the reducing agent addition control can be performed suitably.

As shown in FIG. 4, the limit value of the reducing agent adsorption quantity Qamm in the NOx catalyst decreases and comes closer to zero as the catalyst temperature Tscr increases. That is, the actual reducing agent adsorption quantity in the NOx catalyst is substantially zero when the NOx catalyst is in the high temperature state. Therefore, according to an eighth example aspect of the present invention, the exhaust gas purification device further has an initializing device for initializing the reducing agent adsorption quantity in a case where the catalyst temperature reaches a predetermined high temperature range or in an equivalent case. Thus, the calculation accuracy of the reducing agent adsorption quantity can be maintained by initializing the reducing agent adsorption quantity in this way.

In the NOx catalyst, adsorption of the reducing agent occurs in accordance with the balance between the supply and the consumption of the reducing agent under the operation state of the internal combustion engine. The exhaust gas purification device according to the above aspect of the present invention calculates the reducing agent adsorption quantity by the accumulation of the time-series data in response to the adsorption of the reducing agent. The processing for setting the initial value to once reset the accumulation of the time-series data is equivalent to the initialization.

According to a ninth example aspect of the present invention, the initializing device initializes the reducing agent adsorption quantity to zero or a value close to zero in the case where the catalyst temperature reaches the predetermined high temperature range or in the equivalent case.

According to a tenth example aspect of the present invention, the exhaust gas purification device further has a limit value calculating device for calculating a limit value of the reducing agent adsorption quantity based on a relationship between the catalyst temperature and the limit value of the reducing agent adsorption quantity of the NOx catalyst. The initializing device initializes the reducing agent adsorption quantity with the limit value of the reducing agent adsorption quantity in the case where the catalyst temperature reaches the predetermined high temperature range or in the equivalent case.

Further technologies derivable from the description will be additionally described below. The effects of the following technologies overlap with the effects of the above-described eighth example aspect of the present invention.

(a) An exhaust gas purification device of an internal combustion engine is applied to an exhaust gas purification system that has a NOx catalyst provided in an exhaust passage of the internal combustion engine for adsorbing a reducing agent and for selectively purifying NOx in exhaust gas with the reducing agent and that adds the reducing agent upstream of the NOx catalyst with respect to a flow direction of the exhaust gas by using a reducing agent adding device. The exhaust gas purification device calculates reducing agent adsorption quantity in the NOx catalyst and controls reducing agent addition quantity, which is added by the reducing agent adding device, based on the reducing agent adsorption quantity. The exhaust gas purification device has an obtaining device and an initializing device. The obtaining device obtains temperature of the NOx catalyst or temperature information correlated with the temperature of the NOx catalyst through measurement or estimation. The initializing device initializes the reducing agent adsorption quantity in a case where the catalyst temperature reaches a predetermined high temperature range or in an equivalent case.

Following technology (b) or (c) can be combined with the above-described technology (a).

(b) The initializing device initializes the reducing agent adsorption quantity to zero or a value close to zero in the case where the catalyst temperature reaches the predetermined high temperature range or in the equivalent case.

(c) The exhaust gas purification device further has a device for calculating a limit value of the reducing agent adsorption quantity based on a relationship between the catalyst temperature and the limit value of the reducing agent adsorption quantity of the NOx catalyst. The initializing device initializes the reducing agent adsorption quantity with the limit value of the reducing agent adsorption quantity in the case where the catalyst temperature reaches the predetermined high temperature range or in the equivalent case.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereinafter, an exhaust gas purification device according to each of embodiments of the present invention will be described with reference to the drawings.

First Embodiment

Figure 1:
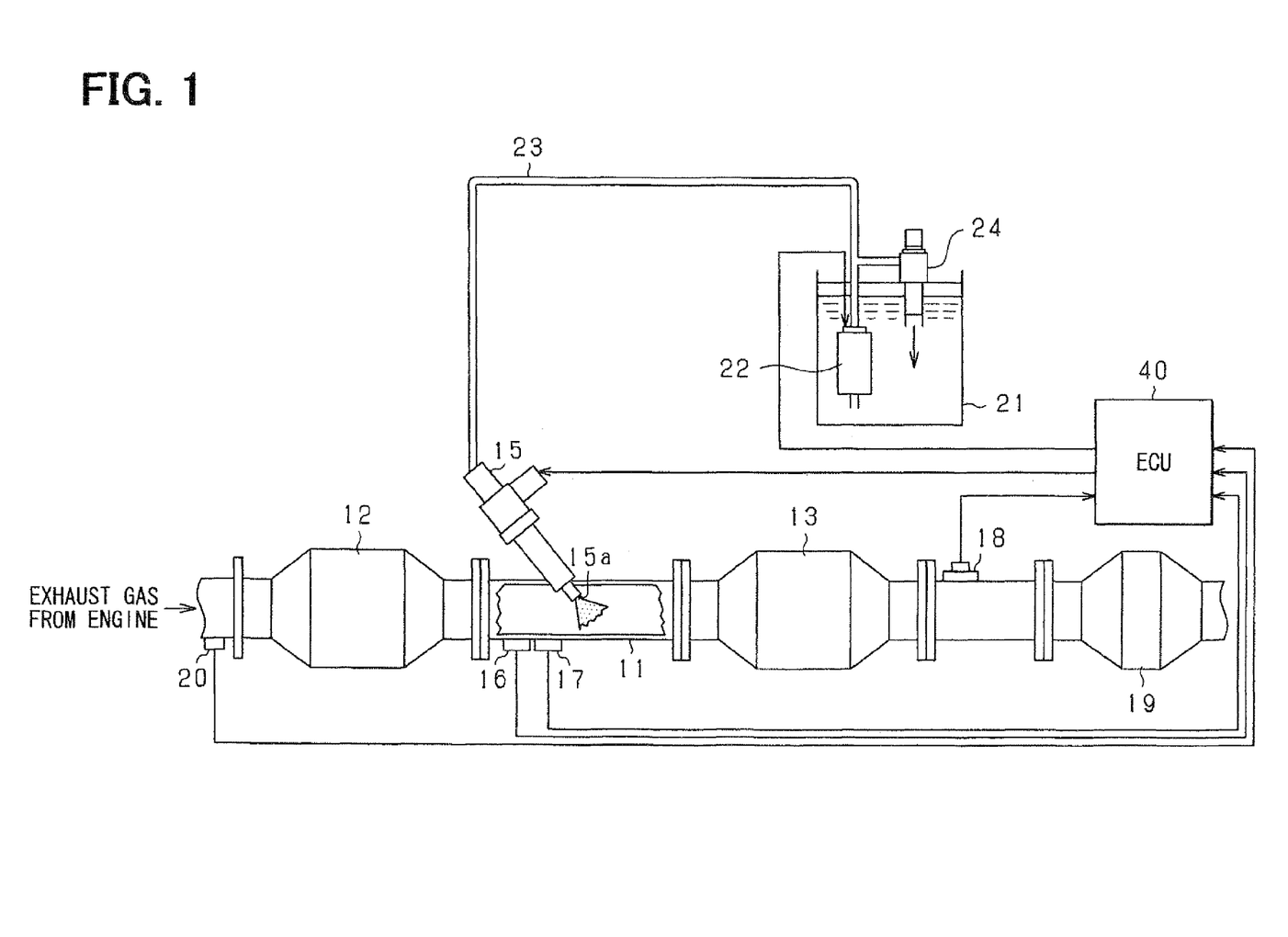
FIG. 1 is a construction diagram showing an outline of an exhaust gas purification system according to a first embodiment of the present invention.

An exhaust gas purification device according to a first embodiment of the present invention purifies NOx in exhaust gas using a selective reduction catalyst and is constructed as a urea SCR system. First, the construction of the system will be explained in detail with reference to FIG. 1. FIG. 1 is a schematic construction diagram showing an outline of the urea SCR system according to the present embodiment. The system has various actuators, various sensors, an ECU 40 (an electronic control unit) and the like for purifying exhaust gas discharged by a diesel engine (not shown) mounted in an automobile.

As for a construction of an engine exhaust system, an oxidation catalyst 12 and a selective reduction catalyst 13 (hereinafter, referred to as an SCR catalyst) are provided in this order from an upstream side in an exhaust pipe 11. The exhaust pipe 11 is connected to an engine main body (not shown) and defines an exhaust passage. A urea solution addition valve 15 for adding and supplying a urea solution (a urea aqueous solution) as a reducing agent into the exhaust pipe 11, a NOx sensor 16 and a temperature sensor 17 are provided between the oxidation catalyst 12 and the SCR catalyst 13 in the exhaust pipe 11. A NOx sensor 18 is provided downstream of the SCR catalyst 13 in the exhaust pipe 11. The NOx sensor 16 senses a NOx concentration in the exhaust gas upstream of the SCR catalyst 13. The NOx sensor 18 senses the NOx concentration in the exhaust gas downstream of the SCR catalyst 13. In the following description, the NOx sensor 16 will be referred to also as an upstream NOx sensor, and the NOx sensor 18 will be referred to also as a downstream NOx sensor.

An oxidation catalyst 19 is provided further downstream of the SCR catalyst 13 in the exhaust pipe 11 as an ammonia removing device for removing ammonia (NH3) discharged from the catalyst 13, i.e., the surplus ammonia. A temperature sensor 20 for sensing temperature of the exhaust gas discharged from the engine main body is provided upstream of the oxidation catalyst 12 in the exhaust pipe 11.

In the above-mentioned construction of the exhaust system, the exhaust gas discharged from the engine main body passes through the oxidation catalyst 12. At that time, NO (nitrogen monoxide) in the exhaust gas is transformed into NO2 (nitrogen dioxide) due to an oxidation effect of the oxidation catalyst 12. Then, NOx reduction using the ammonia is performed in the SCR catalyst 13. Details of the NOx reduction will be explained later.

The oxidation catalyst 12 may be provided as a device integrated with a DPF (Diesel Particulate Filter), which is a particulate matter removing device. In this case, the oxidation catalyst 12 may be integrated with the DPF by providing the oxidation catalyst 12 upstream of the DPF or by supporting the platinum or the like on cell surfaces of the DPF functioning as a support. The DPF is a continually-regenerative particulate matter removal filter for collecting particulate matters in the exhaust gas. The particulate matters collected by the DPF are combusted and removed, for example, by a post-injection performed after a main fuel injection in the diesel engine. The combustion and the removal of the particulate matters are equivalent to regeneration processing. Thus, the DPF can be used continuously.

The SCR catalyst 13 promotes a reduction reaction of NOx (i.e., an exhaust gas purification reaction). The SCR catalyst 13 promotes following reactions to reduce NOx in the exhaust gas.

NO+NO2+2NH3→2N2+3H2O (expression 1)

4NO+4NH3+O2→4N2+6H2O (expression 2)

6NO2+8NH3→7N2+12H2O (expression 3)

The urea solution addition valve 15 provided upstream of the SCR catalyst 13 adds and supplies the ammonia (NH3) as the reducing agent of NOx in the above reactions.

The urea solution addition valve 15 has substantially the same construction as the existing injector for gasoline injection, so a well-known construction of the existing injector can be employed as the construction of the urea solution addition valve 15. Therefore, the construction will be explained only briefly below. The urea solution addition valve 15 is constructed as an electromagnetic on-off valve having a drive section constituted by an electromagnetic solenoid and the like and a valve body section having a needle for opening and closing a tip injection hole section 15a. The urea solution addition valve 15 opens and closes according to an injection drive signal from the ECU 40. That is, if the electromagnetic solenoid is energized based on the injection drive signal, the needle moves in a valve opening direction due to the energization, so the urea solution is added (injected) from the tip injection hole section 15a.

The urea solution is successively supplied from a urea solution tank 21 to the urea solution addition valve 15. Next, a construction of the urea solution supply system will be explained.

The urea solution tank 21 is constituted by a hermetic container with a liquid-supplying cap and stores the urea solution of a prescribed concentration (32.5%) inside. A urea solution pump 22 is provided in the urea solution tank 21 such that the urea solution pump 22 is immersed in the urea solution. The urea solution pump 22 is an electric pump driven by a drive signal from the ECU 40 to rotate. An end of a urea solution supply pipe 23 is connected to the urea solution pump 22, and the other end of the urea solution supply pipe 23 is connected to the urea solution addition valve 15. The urea solution supply pipe 23 defines a urea solution passage. When the urea solution pump 22 is driven to rotate, the urea solution is drawn and discharged toward the urea solution addition valve 15 through the urea solution supply pipe 23.

The urea solution pump 22 is a turbine pump equipped with an electric motor (motor) as a driving source, for example. The urea solution pump 22 is structured such that an impeller rotates and the urea solution is pumped from multiple blade grooves formed on an impeller outer peripheral portion when the electric motor is driven. Alternatively, other type of pump such as a rotor pump may be adopted as the urea solution pump 22. The system is equipped with a pressure regulating valve 24 for regulating pressure of the urea solution. Discharge pressure of the urea solution pump 22 is suitably regulated with the pressure regulating valve 24. A filter (not shown) for filtering the urea solution is provided in a discharge port section of the urea solution pump 22. The urea solution, which is discharged successively, is discharged to the urea solution supply pipe 23 after extraneous matters are removed from the urea solution with the filter.

The ECU 40 is the main part that performs control related to the exhaust gas purification as the electronic control unit in the above-described system. The ECU 40 has a microcomputer (not shown) and performs various kinds of control related to the exhaust gas purification by operating the various actuators including the urea solution addition valve 15 in desired modes based on sensing values of the various sensors. Specifically, according to the present embodiment, suitable quantity of the urea solution is added and supplied into the exhaust pipe 11 at suitable timing by controlling energization time (i.e., valve opening time) of the urea solution addition valve 15, a drive amount of the urea solution pump 22 and the like, for example.

In the above-described system according to the present embodiment, when the engine is operating, the urea solution in the urea solution tank 21 is pumped to the urea solution addition valve 15 through the urea solution supply pipe 23 by the drive of the urea solution pump 22 and the urea solution is added and supplied into the exhaust pipe 11 by the urea solution addition valve 15. Thus, the urea solution is supplied to the SCR catalyst 13 together with the exhaust gas in the exhaust pipe 11, and the exhaust gas is purified by the occurrence of the reduction reaction of NOx at the SCR catalyst 13. On the occasion of the reduction of NOx, ammonia (NH3) is generated when the urea solution is hydrolyzed due to the exhaust heat through a reaction shown by a following expression 4, for example.

(NH2)2CO+H2O→2NH3+CO2 (expression 4)

The ammonia adsorbs to the SCR catalyst 13 and NOx in the exhaust gas are selectively reduced and removed by the ammonia in the SCR catalyst 13. That is, NOx are reduced and purified on the SCR catalyst 13 through the reduction reaction based on the ammonia (as shown by the above-described reaction formulae of expression 1 to expression 3).

Next, urea solution addition control of the urea solution addition valve 15 will be explained. In the present embodiment, feedback control based on the ammonia adsorption quantity is performed basically as the urea solution addition control. The feedback control of the ammonia adsorption quantity is to calculate the actual ammonia adsorption quantity in the SCR catalyst 13 and to control the urea solution addition quantity of the urea solution addition valve 15 such that the calculated ammonia adsorption quantity coincides with a target value. The ammonia adsorption quantity is calculated based on a balance between ammonia supply and ammonia consumption in the SCR catalyst 13.

The temperature Tscr of the SCR catalyst 13 (i.e., SCR catalyst temperature Tscr) and the limit value of the ammonia adsorption quantity Qamm have a relationship shown in FIG. 4. The limit value of the ammonia adsorption quantity Qamm decreases as the SCR catalyst temperature Tscr increases. The limit value of the ammonia adsorption quantity Qamm is the adsorption quantity upper limit, at which the ammonia adsorption is saturated in the SCR catalyst 13. The ammonia adsorption quantity Qamm and a NOx purification rate Rnox basically have a relationship shown in FIG. 5 as an SCR catalyst characteristic. The NOx purification rate Rnox increases as the ammonia adsorption quantity Qamm increases.

In such the case, if the SCR catalyst 13 is in a relatively low temperature state, the limit value of the ammonia adsorption quantity Qamm is large, so sufficient quantity of the ammonia can be adsorbed to the SCR catalyst 13. Therefore, the NOx purification rate Rnox can be maintained at a high level. Moreover, occurrence of the ammonia slip can be inhibited. In contrast, when the SCR catalyst 13 is in a relatively high temperature state, the limit value of the ammonia adsorption quantity Qamm is small, so appropriate management of the ammonia adsorption quantity Qamm is difficult. Under a high temperature condition, desorption of the ammonia from the SCR catalyst 13 increases, and the ammonia slip becomes more apt to occur. For the above-mentioned reasons, it is thought that the urea solution addition control using the ammonia adsorption quantity Qamm cannot be performed appropriately when the SCR catalyst 13 is in the relatively high temperature state.

Therefore, in the present embodiment, an execution mode of the urea solution addition control is switched based on whether the SCR catalyst temperature Tscr is in a predetermined high temperature range or in the other temperature range. More specifically, in the present embodiment, when the SCR catalyst temperature Tscr is equal to or higher than a predetermined value, the urea solution addition control using the ammonia adsorption quantity Qamm as the parameter is stopped and other urea solution addition control, which does not use the ammonia adsorption quantity Qamm as the parameter, is performed. More specifically, as the other urea solution addition control not using the ammonia adsorption quantity Qamm as the parameter, the urea solution addition control is performed based on an addition quantity basic value Bure calculated based on NOx quantity introduced into the SCR catalyst 13 and the catalyst characteristics.

When the SCR catalyst 13 is in the high temperature state, reaction speed of the NOx purification reaction in the SCR catalyst 13 is high. Therefore, the NOx purification rate Rnox can be maintained even without performing the urea solution addition control using the ammonia adsorption quantity Qamm.

Figure 2:
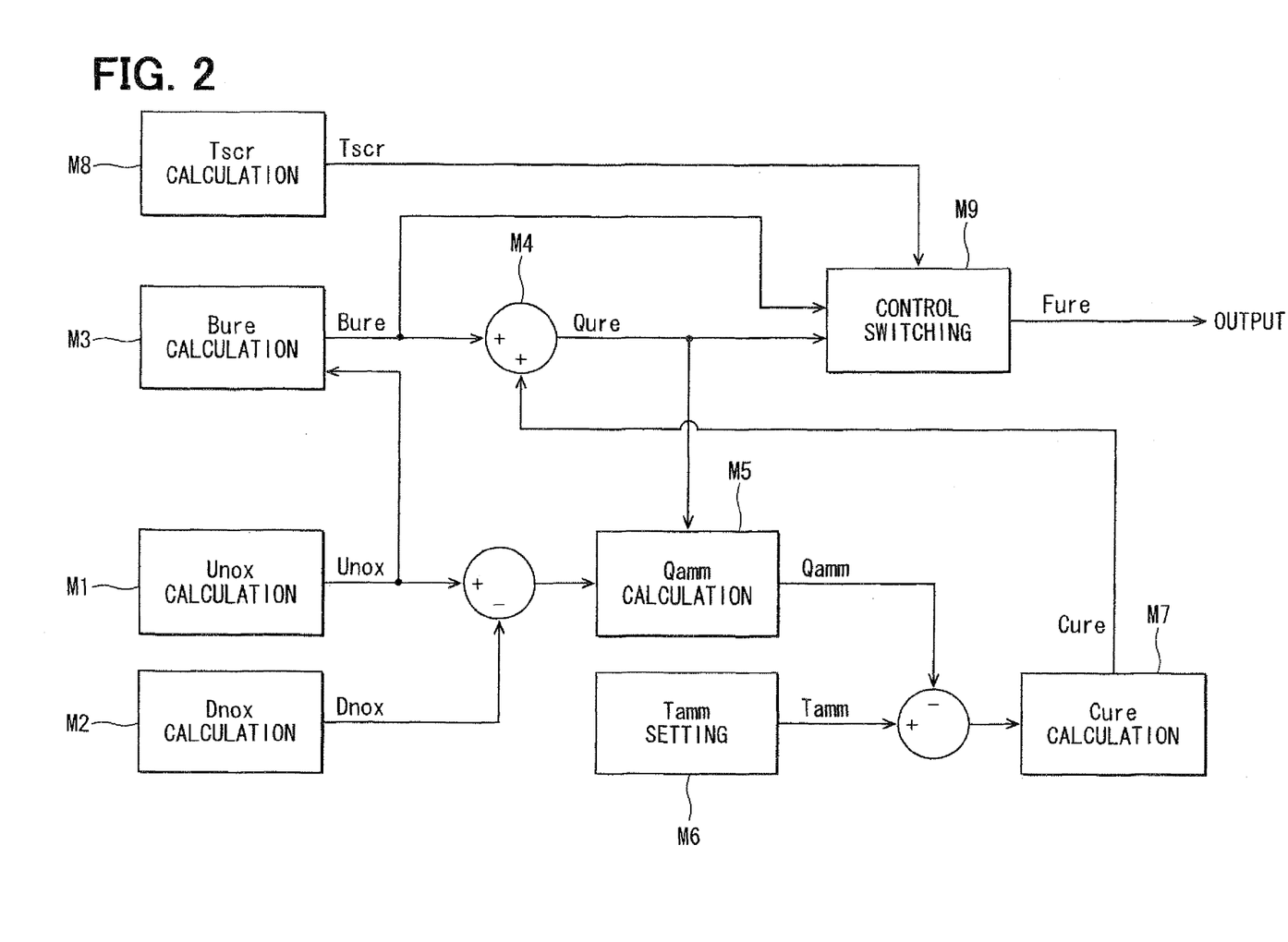
FIG. 2 is a functional block diagram showing entire configuration of urea solution addition control according to the first embodiment.

The entire configuration of the urea solution addition control using the urea solution addition valve 15 is shown in FIG. 2 as a functional block diagram.

Sections in the block diagram of FIG. 2 related to the calculation of the ammonia adsorption quantity Qamm include an upstream NOx quantity calculation section M1, a downstream NOx quantity calculation section M2, a basic addition quantity calculation section M3, an addition quantity correction section M4 and an ammonia adsorption quantity calculation section M5. The upstream NOx quantity calculation section M1 calculates the NOx quantity upstream of the SCR catalyst 13 (hereinafter, referred to as upstream NOx quantity Unox). The downstream NOx quantity calculation section M2 calculates the NOx quantity downstream of the SCR catalyst 13 (hereinafter, referred to as downstream NOx quantity Dnox). The basic addition quantity calculation section M3 calculates the basic addition quantity Bure, which is the basic value of the urea solution addition quantity added by the urea solution addition valve 15, based on the upstream NOx quantity Unox. The addition quantity correction section M4 calculates the urea solution addition quantity Qure by correcting the basic addition quantity Bure, which is calculated in the basic addition quantity calculation section M3, with an addition quantity correction value Cure calculated in a correction value calculation section M7 mentioned in detail later. The ammonia adsorption quantity calculation section M5 calculates the ammonia adsorption quantity Qamm based on a difference between the upstream and downstream NOx quantities Unox, Dnox calculated in the upstream and downstream NOx quantity calculation sections M1, M2 (=Unox−Dnox) and the urea solution addition quantity Qure at the time.

It is also possible to calculate NOx discharge quantity from the engine main body as the upstream NOx quantity Unox in the upstream NOx quantity calculation section M1.

Next, supplemental explanation about the ammonia adsorption quantity calculation section M5 will be given. The calculation section M5 calculates ammonia supply quantity VA supplied to the SCR catalyst 13 through each urea solution addition based on the urea solution addition quantity Qure of each time. The calculation section M5 calculates ammonia consumption quantity VB based on NOx reaction quantity, which is the difference between the upstream NOx quantity Unox and the downstream NOx quantity Dnox. The calculation section M5 calculates adsorption generation quantity VC, which is quantity of ammonia adsorption generated in each urea solution addition of the urea solution addition valve 15, from the ammonia supply quantity VA and the ammonia consumption quantity VB. Furthermore, the calculation section M5 calculates the ammonia adsorption quantity Qamm as actual adsorption quantity in the SCR catalyst 13 by successively integrating the adsorption generation quantity VC. The adsorption generation quantity VC (=VA−VB) as the difference between the ammonia supply quantity VA and the ammonia consumption quantity VB at each time is time-series data of a balance of the reducing agent in the SCR catalyst 13. The adsorption generation quantity VC is calculated in a predetermined time cycle and the calculated value is successively integrated to calculate (estimate) the actual ammonia adsorption quantity Qamm in the SCR catalyst 13.

Sections in the block diagram of FIG. 2 related to the calculation of the addition quantity correction value Cure include the above-described ammonia adsorption quantity calculation section M5, a target value setting section M6 that sets a target value Tamm of the ammonia adsorption quantity Qamm and the correction value calculation section M7 that calculates the addition quantity correction value Cure based on deviation of the ammonia adsorption quantity Qamm from the target value Tamm.

Sections in the block diagram of FIG. 2 related to switching of the addition quantity control include an SCR catalyst temperature calculation section M8 and a control switching section M9. The SCR catalyst temperature calculation section M8 calculates the SCR catalyst temperature Tscr as the temperature of the SCR catalyst 13. The control switching section M9 switches between outputting the urea solution addition quantity Qure calculated in the addition quantity correction section M4 and outputting the basic addition quantity Bure calculated in the basic addition quantity calculation section M3 as a final addition quantity control value Fure based on the SCR catalyst temperature Tscr. The addition quantity control value Fure outputted from the control switching section M9 is equivalent to an output value to the urea solution addition valve 15. Valve opening drive of the urea solution addition valve 15 is performed according to the addition quantity control value Fure. Thus, the urea solution addition control is performed.

That is, the control switching section M9 switches between the case where the addition quantity control value Fure is calculated based on the ammonia adsorption quantity Qamm and the case where the addition quantity control value Fure is calculated not based on the ammonia adsorption quantity Qamm.

Figure 3:
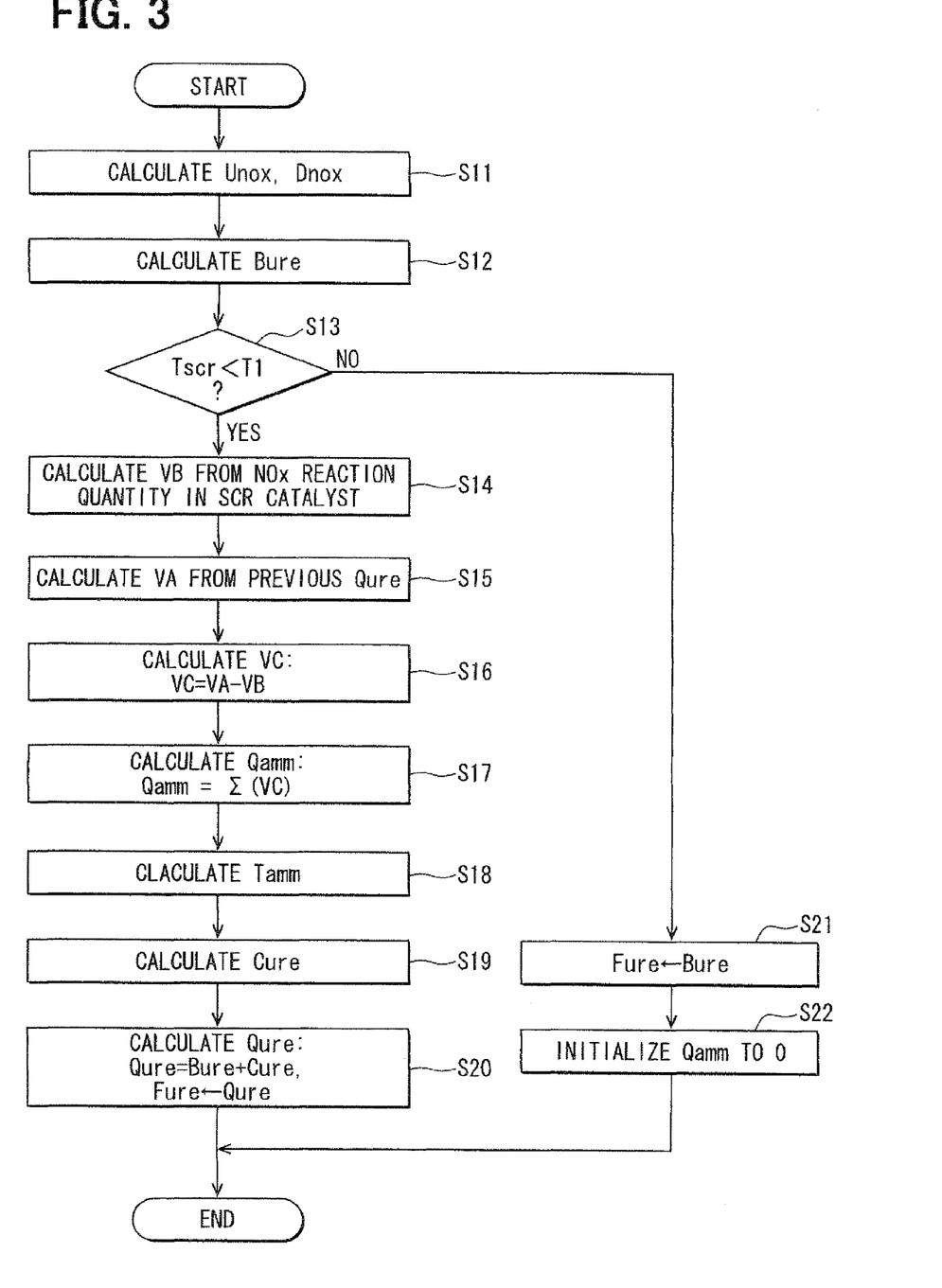
FIG. 3 is a flowchart showing urea solution addition control processing according to the first embodiment.

Next, a procedure of the urea solution addition control performed by the ECU 40 will be explained in detail. FIG. 3 is a flowchart showing the urea solution addition control processing, which is repeatedly executed by the ECU 40 in a predetermined time cycle.

In FIG. 3, in S11 (S means "Step"), the upstream NOx quantity Unox and the downstream NOx quantity Dnox as the NOx quantities upstream and downstream of the SCR catalyst 13 are calculated. The upstream NOx quantity Unox is NOx quantity introduced into the SCR catalyst 13 at each time. The upstream NOx quantity Unox is calculated based on the upstream NOx concentration sensed from the output value of the upstream NOx sensor 16 and an exhaust gas flow rate sensed from an output value of an airflow meter (not shown) provided in the intake pipe. The downstream NOx quantity Dnox is calculated based on the downstream NOx concentration sensed from the output value of the downstream NOx sensor 18 and the exhaust gas flow rate sensed from the output value of the airflow meter. It is also possible to calculate the exhaust gas flow rate using a map or a mathematical expression from operation state parameters such as the engine rotation speed and the fuel injection quantity. It is also possible to measure the exhaust gas flow rate with a flow rate sensor provided in the exhaust pipe.

In following S12, the basic addition quantity Bure of the urea solution is calculated The upstream NOx quantity Unox is used as a parameter for the calculation. The basic addition quantity Bure is calculated to be a larger value as the upstream NOx quantity Unox increases.

Then, in S13, it is determined whether the SCR catalyst temperature Tscr at the time is lower than a predetermined value T1. The predetermined value T1 is set based on the relationship of FIG. 4 and is defined based on the desired limit value of the ammonia adsorption quantity Qamm. In the present embodiment, T1 is set at 300 degrees C. Activation temperature of the SCR catalyst 13 is approximately 200 degrees C., and the value T1 is set higher than the activation temperature. For example, the activation temperature is the catalyst temperature at which predetermined NOx purification performance can be exerted. If Tscr<T1, the process proceeds to S14. If Tscr≧T1, the process proceeds to S21.

If Tscr<T1 and the process proceeds to S14, calculation processing of the ammonia adsorption quantity Qamm is performed in S14 to S17. More specifically, in S14, the NOx reaction quantity in the SCR catalyst 13 is calculated from the difference between the upstream NOx quantity Unox and the downstream NOx quantity Dnox. Furthermore, in S14, the ammonia consumption quantity VB in the SCR catalyst 13 is calculated based on the NOx reaction quantity. At this time, for example, it is desirable to calculate the ammonia consumption quantity VB from the NOx reaction quantity also in accordance with the temperature of the SCR catalyst 13 and the like. In S15, the ammonia supply quantity VA as the quantity of the ammonia actually supplied to the SCR catalyst 13 through the previous urea solution addition by the urea solution addition valve 15 is calculated based on the previous value of the urea solution addition quantity Qure. For example, it is desirable to calculate the ammonia supply quantity VA also in accordance with the exhaust gas temperature and the like.

In S16, the adsorption generation quantity VC as the quantity of the ammonia adsorbing to the SCR catalyst 13 due to the urea solution addition (i.e., ammonia supply) is calculated from the difference between the ammonia supply quantity VA and the ammonia consumption quantity VB. In following S17, the ammonia adsorption quantity Qamm is calculated by sequentially integrating the adsorption generation quantity VC calculated in S16.

Figure 5:
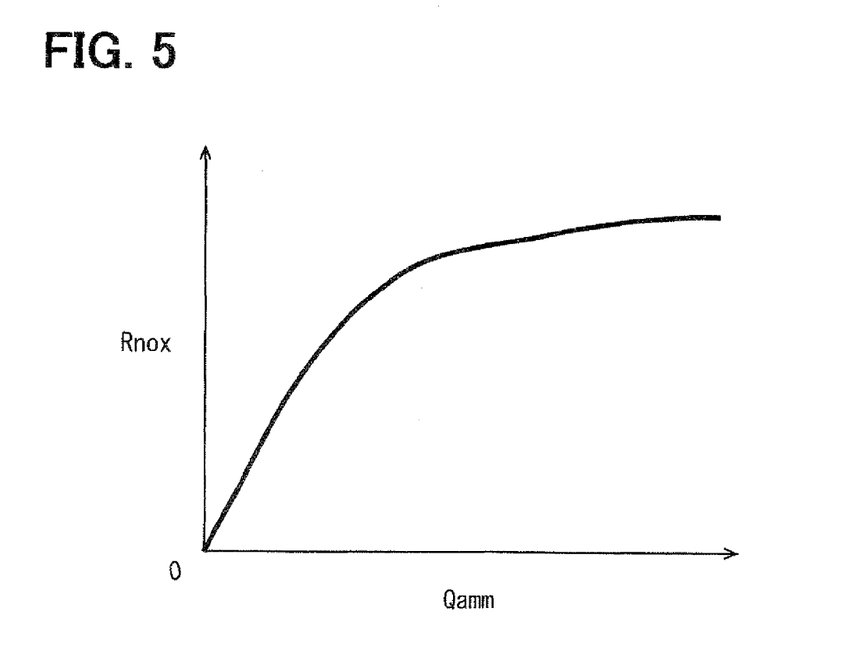
FIG. 5 is a diagram showing a relationship between the ammonia adsorption quantity and a NOx purification rate.

Then, in following S18, an upper limit of the NOx purification rate Rnox of the SCR catalyst 13 is calculated from the SCR catalyst characteristic defined beforehand, and the target value Tamm of the ammonia adsorption quantity Qamm is calculated from the upper limit. The SCR catalyst characteristic is defined as a relationship between the ammonia adsorption quantity Qamm and the NOx purification rate Rnox, for example, as shown in FIG. 5. The target value Tamm of the ammonia adsorption quantity Qamm is calculated based on the upper limit, above which the NOx purification rate Rnox is substantially constant with respect to the ammonia adsorption quantity Qamm. The target value Tamm may be calculated also in accordance with the exhaust temperature.

In S19, the addition quantity correction value Cure is calculated based on the deviation of the ammonia adsorption quantity Qamm from the target value Tamm. In the present embodiment, the feedback control based on the ammonia adsorption quantity Qamm is performed. The deviation of the ammonia adsorption quantity Qamm from the target value Tamm is calculated and the addition quantity correction value Cure is calculated using a feedback method such as PI or PID to remove the deviation of the ammonia adsorption quantity Qamm.

Finally, in S20, the urea solution addition quantity Qure is calculated by adding the basic addition quantity Bure and the addition quantity correction value Cure, and the urea solution addition quantity Qure is employed as the final addition quantity control value Fure. That is, the final addition quantity control value Fure is calculated by reflecting the feedback control based on the ammonia adsorption quantity Qamm, and the urea solution addition is performed with the urea solution addition valve 15 based on the addition quantity control value Fure.

When Tscr≧T1 and the process proceeds from S13 to S21, the basic addition quantity Bure calculated in S12 is employed as the final addition quantity control value Fure.

That is, the final addition quantity control value Fure is calculated not based on the ammonia adsorption quantity Qamm but based on the basic addition quantity Bure. The urea solution addition is performed with the urea solution addition valve 15 based on the addition quantity control value Fure. The ammonia adsorption quantity Qamm is initialized in following S22. In the present embodiment, the ammonia adsorption quantity Qamm stored in a memory (RAM) at the time is cleared to zero.

Next, supplemental explanation about initialization of the ammonia adsorption quantity Qamm performed when the SCR catalyst 13 is brought to the high temperature state (when Tscr≧T1) will be provided.

The ammonia adsorption quantity Qamm contains a certain degree of error (a calculation error) with respect to the actual adsorption quantity in the SCR catalyst 13. Accordingly, there is a concern that the urea solution addition control is not performed appropriately due to the calculation error, thereby deteriorating the NOx purification rate Rnox or causing the ammonia slip. Therefore, it is desirable to perform the initialization processing to remove the error in the ammonia adsorption quantity Qamm.

Therefore, in the present embodiment, the relationship of FIG. 4 is used and the ammonia adsorption quantity Qamm is initialized to zero or a small value near zero in a state where the SCR catalyst 13 has been brought to the high temperature state and the limit value of the ammonia adsorption quantity Qamm has decreased, i.e., in a state where the ammonia adsorption performance of the SCR catalyst 13 has lowered and the actual ammonia adsorption quantity has decreased. That is, in the high temperature state of the SCR catalyst 13, the quantity of the ammonia capable of adsorbing to the SCR catalyst 13 is limited to small quantity. Moreover, in such the state, even if the ammonia adsorbs, the ammonia desorbs immediately since the reaction speed is high. Therefore, in the high temperature state of the SCR catalyst 13, the initialization of the ammonia adsorption quantity Qamm using zero or the small value near zero is possible. An arbitrary value between the limit value of the ammonia adsorption quantity Qamm decided by the relationship of FIG. 4 and zero may be used as the value for the initialization. For example, a value within X1 of FIG. 4 may be used. The initialization using the limit value of the ammonia adsorption quantity Qamm is also possible.

According to the flowchart of FIG. 3 explained above the ammonia adsorption quantity Qamm is initialized to zero when the SCR catalyst 13 is brought to the high temperature state because of the increase of the engine load and the like and the urea solution addition control based on the ammonia adsorption quantity Qamm is stopped. Thereafter, when the urea solution addition control based on the ammonia adsorption quantity Qamm is resumed, the calculation of the ammonia adsorption quantity Qamm by the integration of the adsorption generation quantity VC is performed from the value (=0) of the initialization.

The present embodiment described above exerts following effects.

When the SCR catalyst temperature Tscr is in the predetermined high temperature state (when Tscr≧T1), the urea solution addition quantity control based on the ammonia adsorption quantity Qamm is stopped and the control switching for switching from the urea solution addition control based on the ammonia adsorption quantity Qamm to the urea solution addition control not based on the ammonia adsorption quantity Qamm is performed. Therefore, the urea solution addition control can be performed suitably even when the appropriate management of the ammonia adsorption quantity Qamm becomes difficult because of the generation of the ammonia slip or the like due to the high temperature state of the SCR catalyst 13. As a result, the NOx purification in the SCR catalyst 13 can be performed suitably.

When the SCR catalyst temperature Tscr is high, the NOx quantity is large as compared to the quantity of the ammonia that can adsorb to the SCR catalyst 13 and the time of the NOx purification reaction is short. In such the case, contribution of the ammonia adsorption quantity to the NOx purification performance is low. Therefore, there is no need to particularly consider the ammonia adsorption quantity Qamm. In such the case, the NOx purification rate Rnox can be maintained even if the urea solution addition control is performed without taking the ammonia adsorption quantity Qamm into account.

The ammonia adsorption quantity Qamm is initialized to zero when the SCR catalyst temperature Tscr is brought to the predetermined high temperature state (i.e., when Tscr≧T1). Accordingly, the suitable initialization of the ammonia adsorption quantity Qamm can be performed in consideration of the catalyst characteristic shown in FIG. 4. Thus, the calculation accuracy of the ammonia adsorption quantity Qamm can be maintained.

It is thought that the state where the SCR catalyst temperature Tscr becomes the high temperature includes a state where the engine is in a heavy-load state and both of the exhaust flow rate and the NOx discharge quantity increase at the same time. In this case, if the NOx discharge quantity increases, the calculation error of the ammonia adsorption quantity Qamm is caused by the deterioration of the accuracy of the various sensors such as the NOx sensor, occurrence of the ammonia slip and the like. In this regard, according to the above-described present embodiment, the urea solution addition control based on the ammonia adsorption quantity Qamm is stopped when the SCR catalyst temperature Tscr is high. Therefore, the lowering of the control accuracy accompanying the occurrence of the calculation error of the ammonia adsorption quantity Qamm can be inhibited.

Second Embodiment

Next, a second embodiment of the present invention will be described, focusing on differences from the first embodiment. A construction according to the present embodiment switches between the urea solution addition control performed based on the ammonia adsorption quantity Qamm (hereinafter, referred to as first control) and the urea solution addition control performed not based on the ammonia adsorption quantity Qamm (hereinafter, referred to as second control). In the above construction, hysteresis is provided between a catalyst temperature threshold value in the case of switching from the first control to the second control and a catalyst temperature threshold value in the case of switching from the second control to the first control.

Figure 6:
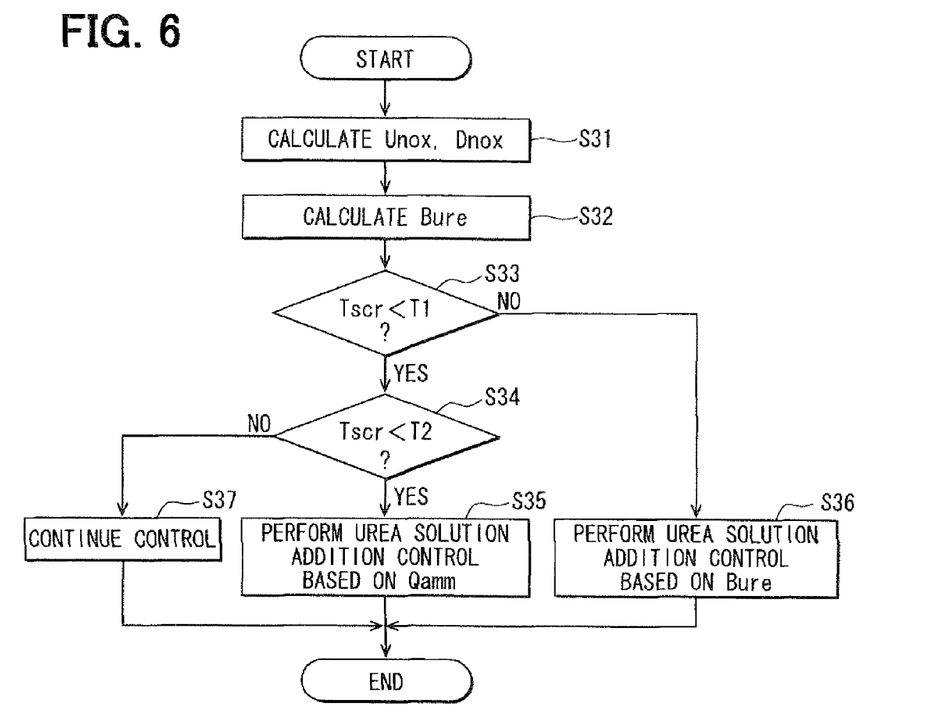
FIG. 6 is a flowchart showing urea solution addition control processing according to a second embodiment of the present invention.

FIG. 6 is a flowchart showing the urea solution addition control processing according to the present embodiment, which is performed in place of the processing of FIG. 3 of the first embodiment.

In S31 of FIG. 6, the upstream NOx quantity Unox and the downstream NOx quantity Dnox are calculated. In following S32, the basic addition quantity Bure of the urea solution is calculated. Processing in S31 and S32 is the same as the processing in S11 and S12 of FIG. 3.

Then, in S33, it is determined whether the SCR catalyst temperature Tscr is lower than a predetermined value T1. Then, in S34, it is determined whether the SCR catalyst temperature Tscr is lower than a predetermined value T2. The processing of S33 is the same as the processing of S13 of FIG.

3. The predetermined value T1 is 300 degrees C., for example. The predetermined value T2 is the temperature lower than the predetermined value T1 (T2<T1). For example, T2=280 degrees C. Both of the predetermined values T1, T2 are set in a temperature range where the limit value of the ammonia adsorption quantity Qamm is small, i.e., in a temperature range where the SCR catalyst 13 is in the high temperature state (i.e., a temperature range equal to or higher than the activation temperature of the SCR catalyst 13).

If Tscr<T2, the process proceeds to S35, in which the urea solution addition control using the ammonia adsorption quantity Qamm as the parameter (i.e., the first control) is performed. If Tscr≧T1, the process proceeds to S36, in which the urea solution addition control not using the ammonia adsorption quantity Qamm as the parameter (i.e., the second control) is performed. If T2≦Tscr<T1, the process proceeds to S37, in which the current urea solution addition control (the first control or the second control) is continued without switching the control.

The processing in S35 corresponds to the processing of S14 to S20 of FIG. 3. In S35, feedback control of the urea solution addition quantity is performed to conform the ammonia adsorption quantity Qamm to the target value Tamm. The processing in S36 corresponds to the processing of S21 of FIG. 3. In S36, open control of the urea solution addition quantity based on the basic addition quantity Bure is performed without using the ammonia adsorption quantity Qamm as the parameter (in addition, the initialization processing of S22 may be performed).

Figure 7:
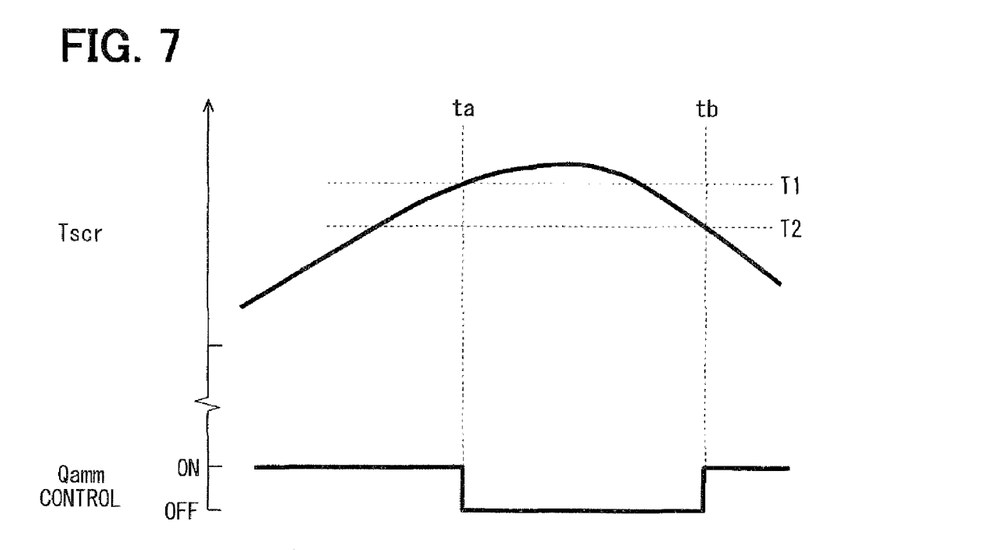
FIG. 7 is a time chart for explaining a switching operation of ammonia adsorption quantity control according to the second embodiment.

In short, as shown in a time chart of FIG. 7, the urea solution addition control using the ammonia adsorption quantity Qamm as the parameter (i.e., the first control) is performed before timing ta, before which the SCR catalyst temperature Tscr is lower than the predetermined value T1. Then, after the SCR catalyst temperature Tscr exceeds the predetermined value T1 at the timing ta due to the increase of the SCR catalyst temperature Tscr, the urea solution addition control not using the ammonia adsorption quantity Qamm as the parameter (i.e., the second control) is performed. Thereafter, when the SCR catalyst temperature Tscr becomes lower than the predetermined value T2 at timing tb after the SCR catalyst temperature Tscr takes a downward turn, the urea solution addition control using the ammonia adsorption quantity Qamm as the parameter (i.e., the first control) is started again. That is, the execution mode of the urea solution addition control is switched with the hysteresis by using the predetermined values T1, T2 as the temperature threshold values.

Thus, by switching the urea solution addition control with the hysteresis, the switching frequency between the first control and the second control (which is also frequency of stoppage and resumption of the urea solution addition control using the ammonia adsorption quantity Qamm) can be reduced. The temperature range where the control switching is performed (i.e., the temperature range from T1 to T2) is the high temperature range where the accuracy of the addition quantity control based on the ammonia adsorption quantity Qamm tends to fall. The fall of the control accuracy can be inhibited by reducing the frequency of the control switching in such the temperature range.

For example, after the addition quantity control based on the ammonia adsorption quantity Qamm is stopped because the SCR catalyst temperature Tscr becomes the high temperature, the timing of the resumption of the same addition quantity control can be delayed. Accordingly, the accuracy of the addition quantity control can be improved at the timing of the resumption of the addition quantity control based on the ammonia adsorption quantity Qamm.

If the urea solution addition control is switched frequently it is anticipated that the sudden change of the urea solution addition quantity is performed repeatedly thereby adversely affecting the urea solution addition valve 15 and the like. Such the inconveniences can be inhibited with the above construction according to the present embodiment.

Third Embodiment

Next, a third embodiment of the present invention will be described. The third embodiment is different from the first and second embodiments in a following point. That is, in the feedback control of the urea solution addition quantity using the ammonia adsorption quantity Qamm according to the third embodiment, the execution mode of the feedback control is changed based on the SCR catalyst temperature Tscr of each time. More specifically, the execution mode is changed by changing a feedback upper limit and a feedback gain.

Figure 8:
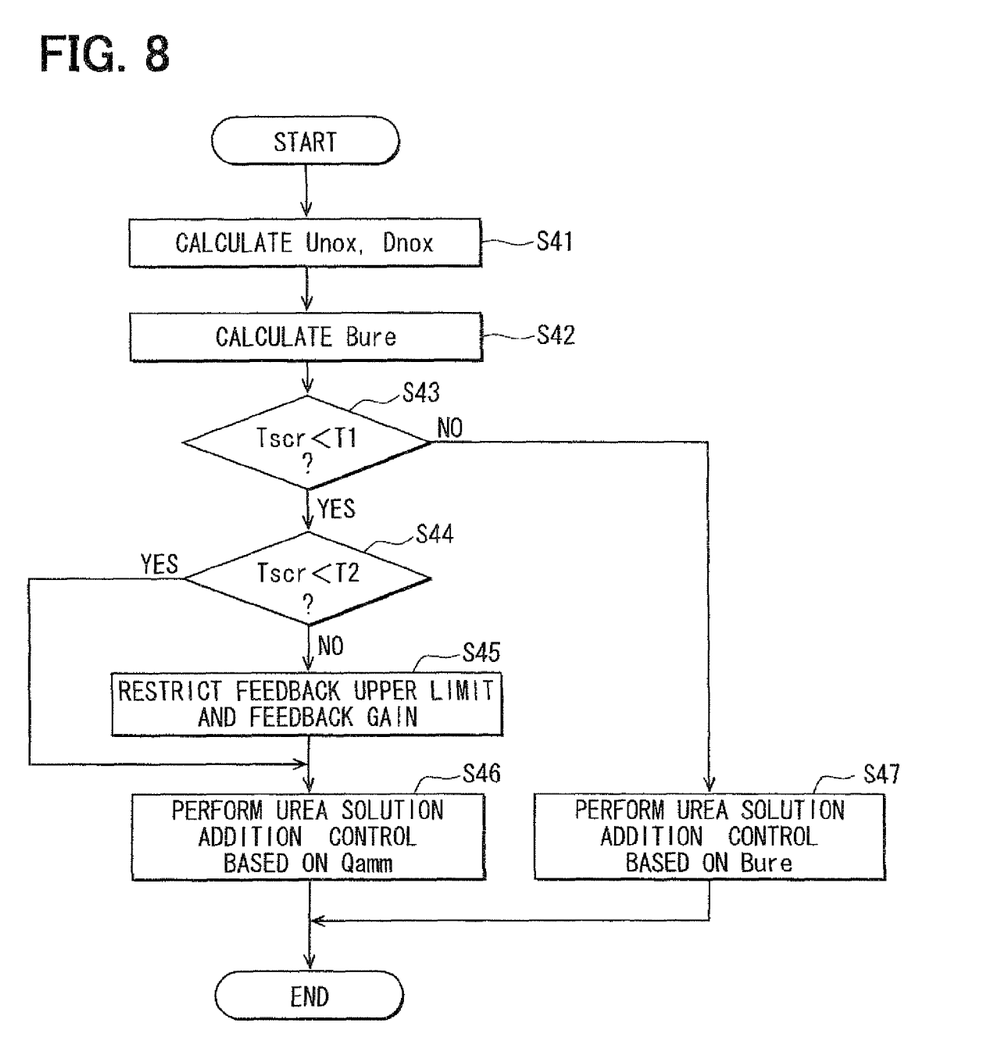
FIG. 8 is a flowchart showing urea solution addition control processing according to a third embodiment of the present invention.

FIG. 8 is a flowchart showing the urea solution addition control processing according to the present embodiment, which is performed in place of the processing of FIG. 6 of the second embodiment.

In S41 of FIG. 8, the upstream NOx quantity Unox and the downstream NOx quantity Dnox are calculated (as in S31 of FIG. 6). In following S42, the basic addition quantity Bure of the urea solution is calculated (as in S32 of FIG. 6). In S43, it is determined whether the SCR catalyst temperature Tscr is lower than the predetermined value T1 (as in S33 of FIG. 6). In S44, it is determined whether the SCR catalyst temperature Tscr is lower than the predetermined value T2 (as in S34 of FIG. 6). As described above, both of the predetermined values T1, T2 are set in the range where the limit value of the ammonia adsorption quantity Qamm is small, i.e., in the temperature range where the SCR catalyst 13 is in the high temperature state.

If Tscr≧T1, the urea solution addition control not using the ammonia adsorption quantity Qamm as the parameter is performed in S47 (as in S36 of FIG. 6). That is, the open control of the urea solution addition quantity using the basic addition quantity Bure is performed without using the ammonia adsorption quantity Qamm as the parameter.

In contrast, when Tscr<T1, the urea solution addition control using the ammonia adsorption quantity Qamm as the parameter is performed (in S45 and S46). At this time, basically, the feedback control of the urea solution addition quantity is performed to conform the ammonia adsorption quantity Qamm to the target value Tamm (as in S35 of FIG. 6). Moreover, specifically, the execution mode of the feedback control is changed in accordance with whether the SCR catalyst temperature Tscr is "equal to or higher than" the predetermined value T2. That is, when the SCR catalyst temperature Tscr is lower than the predetermined value T2, the feedback control is performed based on the normal feedback upper limit and the normal feedback gain. In contrast, when the SCR catalyst temperature Tscr is equal to or higher than the predetermined value T2 (i.e., if T2≦Tscr<T1), the feedback upper limit and the feedback gain are restricted. Then, the feedback control is performed based on the restricted feedback upper limit and the restricted feedback gain.

Figure 9A:
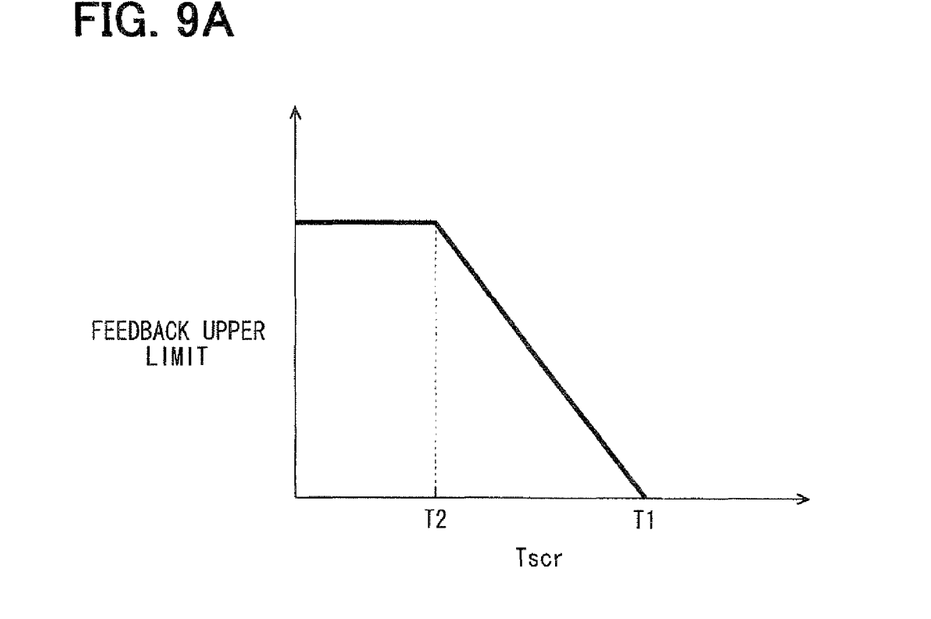
FIG. 9A is a diagram showing a relationship between SCR catalyst temperature and a feedback upper limit according to the third embodiment.
Figure 9B:
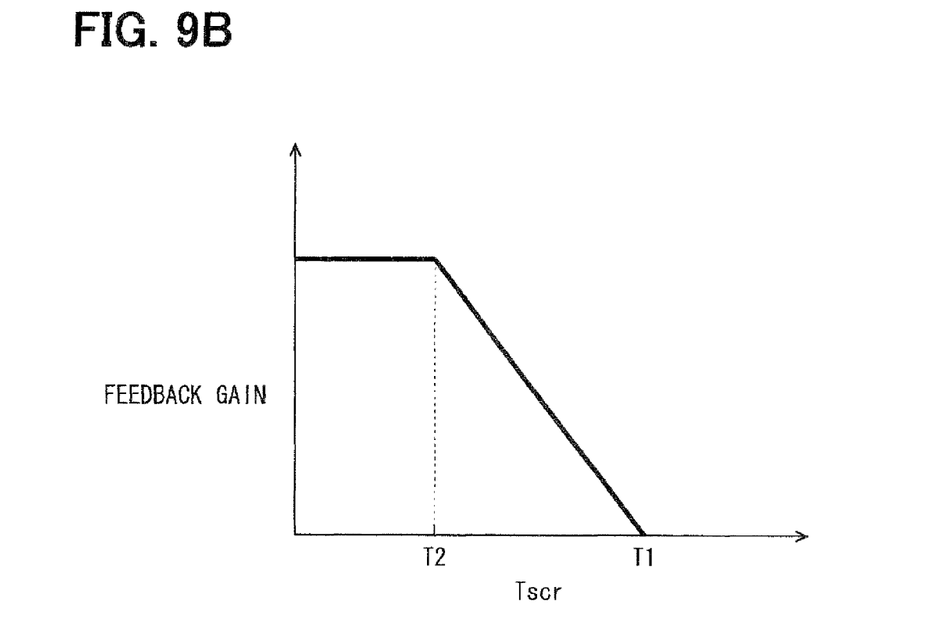
FIG. 9B is a diagram showing a relationship between the SCR catalyst temperature and a feedback gain according to the third embodiment.

In the processing of S45, the feedback upper limit and the feedback gain are set based on FIGS. 9A and 9B. According to FIG. 9A, when the SCR catalyst temperature Tscr is in the temperature range from T1 to T2, the feedback upper limit is gradually decreased as the temperature Tscr increases. According to FIG. 9B, when the SCR catalyst temperature Tscr is in the temperature range from T1 to T2, the feedback gain is gradually decreased as the temperature Tscr increases.

Alternatively, different values of multiple steps may be set for each of the feedback upper limit and the feedback gain respectively, and each of the feedback upper limit and the feedback gain may be changed stepwise with the different values of the multiple steps. Alternatively, only either one of the feedback upper limit and the feedback gain may be set variably.

The feedback upper limit may be set using a following expression, in which α represents the feedback upper limit, and β and γ are constants (β<0).

$$\alpha = (Tscr - T2)/(T1 - T2) \times \beta + \gamma$$

The urea solution addition control based on the ammonia adsorption quantity Qamm is stopped when the SCR catalyst temperature Tscr is in the predetermined high temperature state as mentioned above (i.e., when Tscr≧T1). In such the construction, the feedback upper limit and the feedback gain are changed gradually in the temperature range that is close to and lower than the threshold temperature T1 (which is the boundary temperature), i.e., in the temperature range from T1 to T2. Thus, performance of the control to follow the feedback target value can be changed suitably. Accordingly, in the construction that switches between the stoppage and the resumption of the addition quantity control based on the ammonia adsorption quantity Qamm, the switching can be performed smoothly.

When the stoppage and the resumption of the addition quantity control based on the ammonia adsorption quantity Qamm are switched frequently, occurrence of sudden change of the urea solution addition quantity is anticipated and there is a concern that the sudden change adversely affects the urea solution addition valve 15 and the like. Such the inconveniences can be inhibited with the above construction according to the present embodiment.

Fourth Embodiment

Next, a fourth embodiment of the present invention will be described. The present embodiment is different from the above-described embodiments in a following point. That is, according to the fourth embodiment, the urea solution addition control using the NOx purification rate Rnox is performed as the urea solution addition control not using the ammonia adsorption quantity Qamm. That is, the control is switched from the urea solution addition control based on the ammonia adsorption quantity Qamm (equivalent to the first control) to the urea solution addition control based on the NOx purification rate Rnox (equivalent to the second control) when the SCR catalyst temperature Tscr is higher than a predetermined value.

Figure 10:
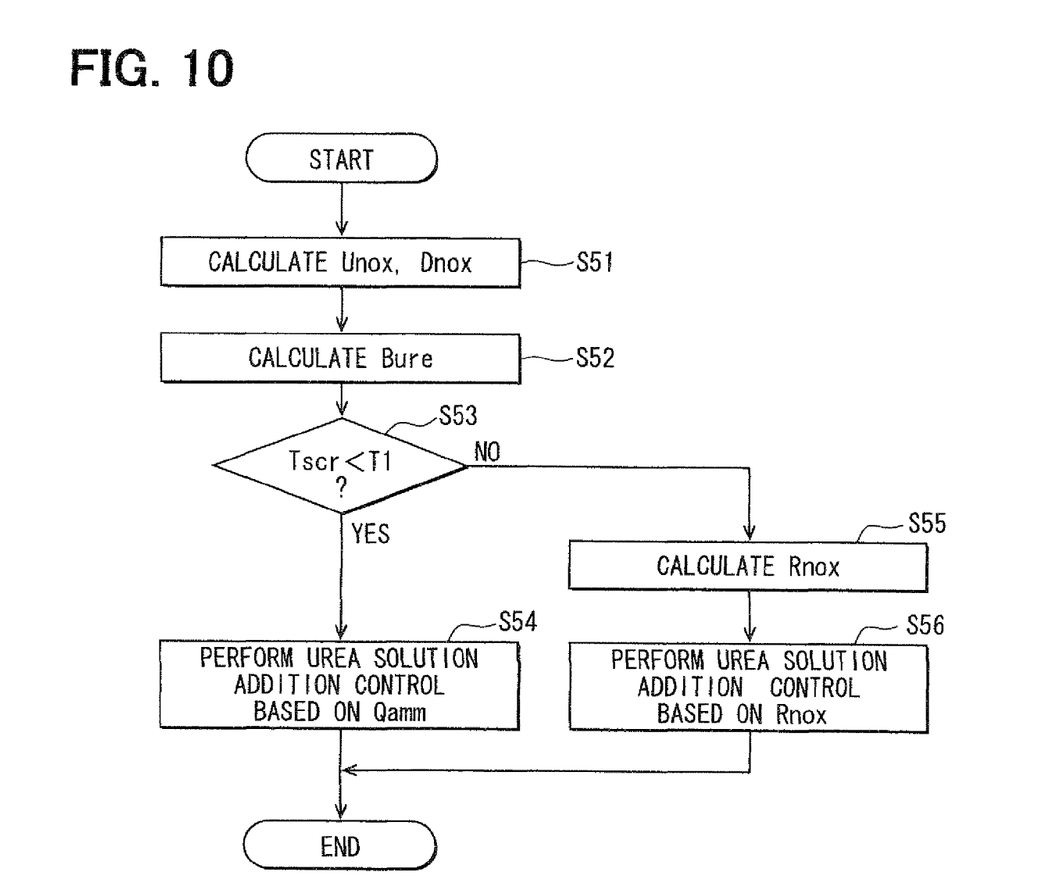
FIG. 10 is a flowchart showing urea solution addition control processing according to a fourth embodiment of the present invention.

FIG. 10 is a flowchart showing the urea solution addition control processing according to the present embodiment, which includes a part changed from the processing of FIG. 6 of the second embodiment.

In S51 of FIG. 10, the upstream NOx quantity Unox and the downstream NOx quantity Dnox are calculated (as in S31 of FIG. 6). In following S52, the basic addition quantity Bure of the urea solution is calculated (as in S32 of FIG. 6). Then, in S53, it is determined whether the SCR catalyst temperature Tscr is lower than the predetermined value T1 (as in S33 of FIG. 6).

When Tscr<T1, the process proceeds to S54, in which the urea solution addition control using the ammonia adsorption quantity Qamm is performed (as in S35 of FIG. 6).

When Tscr≧T1, the process proceeds to S55, in which the actual NOx purification rate Rnox at the present time is calculated. More specifically, the actual NOx purification rate Rnox in the SCR catalyst 13 is calculated from the upstream NOx quantity Unox and the downstream NOx quantity Dnox. The NOx purification rate Rnox is calculated by dividing the difference between the upstream NOx quantity Unox and the downstream NOx quantity Dnox by the upstream NOx quantity Unox. That is, the NOx purification rate Rnox is calculated by a following formula.

$$Rnox = (Unox - Dnox)/Unox$$

Then, in S56, the urea solution addition control is performed based on the NOx purification rate Rnox. That is, the urea solution addition control is performed not based on the ammonia adsorption quantity Qamm but based on the NOx purification rate Rnox. At this time, the urea solution addition control is performed such that the urea solution addition quantity is increased when the actual NOx purification rate Rnox (calculated in S55) is smaller than the target value of the NOx purification rate Rnox and such that the urea solution addition quantity is decreased when the actual NOx purification rate Rnox (calculated in S55) is larger than the target value.

Therefore, also in the fourth embodiment, as in the other embodiments described above, the urea solution addition control can be performed suitably even when the appropriate management of the ammonia adsorption quantity Qamm becomes difficult, for example, when the SCR catalyst 13 is in the high temperature state and the ammonia slip occurs. As a result, the NOx purification in the SCR catalyst 13 can be performed suitably.

As described above, the control is switched from the urea solution addition control based on the ammonia adsorption quantity Qamm to the urea solution addition control based on the NOx purification rate Rnox when the SCR catalyst temperature Tscr is higher than the predetermined value. In such the construction, hysteresis may be provided to the switching temperature (i.e., the catalyst temperature threshold value). Details in this case are the same as the second embodiment.

Also, in the construction that switches the control from the urea solution addition control based on the ammonia adsorption quantity Qamm to the urea solution addition control based on the NOx purification rate Rnox when the SCR catalyst temperature Tscr is higher than the predetermined value, the feedback upper limit and the feedback gain may be gradually changed in the temperature range that is close to and lower than the threshold temperature T1 (the boundary temperature) of the control switching, i.e., in the temperature range from T1 to T2. In this case, the feedback upper limit and the feedback gain may be gradually changed only when the control is returned to the urea solution addition control based on the ammonia adsorption quantity Qamm (i.e., in the switching from the second control to the first control). Details in this case are the same as the third embodiment.

Other Embodiments

The present invention is not limited to the above-described embodiments but may be implemented as follows, for example.

A condition that the NOx quantity introduced into the SCR catalyst 13 is equal to or larger than a predetermined quantity may be included in the conditions for switching the execution mode of the urea solution addition control in addition to the condition that the SCR catalyst temperature Tscr is equal to or higher than the predetermined value. That is, the ammonia adsorption quantity Qamm of the SCR catalyst 13 is estimated by sequentially integrating the balance between the supply and the consumption of the ammonia. In this case, it is thought that the calculation error increases as the NOx quantity increases and the addition quantity of the urea solution increases. The ammonia slip occurs more easily as the NOx quantity increases. Because of these factors, the calculation error of the ammonia adsorption quantity Qamm tends to increase as the NOx quantity increases. Therefore, the urea solution addition control based on the ammonia adsorption quantity Qamm is stopped when the NOx quantity introduced into the SCR catalyst 13 (or the NOx discharge quantity from the engine) is equal to or greater than the predetermined quantity.

The catalyst temperature threshold value (i.e., the predetermined value T1) for determining the high temperature state of the SCR catalyst 13 may be set variably. For example, a degradation degree of the SCR catalyst 13 may be measured and the catalyst temperature threshold value (the predetermined value T1) may be set variably based on the measured degradation degree. In this case, the catalyst temperature threshold value (the predetermined value T1) may be set to a smaller value as the degradation degree increases.

In the above-described embodiments, the SCR catalyst temperature Tscr is measured from the output of the temperature sensor 17 provided upstream of the SCR catalyst 13, and the execution mode of the urea solution addition control is switched based on the SCR catalyst temperature Tscr. Alternatively, temperature of the exhaust gas discharged from the engine 10 may be measured with a sensor or the like or may be estimated by calculation based on the engine operation state, and the execution mode of the urea solution addition control may be switched based on the exhaust temperature. In this case, the exhaust temperature is equivalent to temperature information of the NOx catalyst.

Alternatively, the execution mode of the urea solution addition control may be switched based on the engine load of each time with the use of a correlation between the engine operation load and the SCR catalyst temperature Tscr. That is, when the engine load is high, the exhaust temperature increases and the SCR catalyst temperature Tscr increases. Therefore, when the engine load is equal to or larger than a predetermined value, the urea solution addition control based on the ammonia adsorption quantity Qamm is stopped. In this case, in place of the urea solution addition control based on the ammonia adsorption quantity Qamm, the urea solution addition control based on the basic addition quantity or the urea solution addition control based on the NOx purification rate Rnox is performed. The engine load can be estimated from the engine rotation speed, the fuel injection quantity the intake air flow rate, the NOx discharge quantity, the exhaust temperature and the like.

The present invention can be embodied also in other systems than the urea SCR system described above. For example, the present invention can be embodied in a system that generates the urea solution or the ammonia as the reducing agent from solid urea as an ammonia generation source, a system that uses the fuel such as light oil as the ammonia generation source, a system that adds the ammonia directly to the exhaust passage, a system that uses a reducing agent (HC or the like) other than the ammonia or the like.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust gas purification device of an internal combustion engine applied to an exhaust gas purification system that has a NOx catalyst provided in an exhaust passage of the internal combustion engine for adsorbing a reducing agent and for selectively purifying NOx in exhaust gas with the reducing agent and that adds the reducing agent upstream of the NOx catalyst with respect to a flow direction of the exhaust gas by using a reducing agent adding unit, the exhaust gas purification device comprising:
    an electronic control unit configured to:
        obtain temperature of the NOx catalyst or temperature information correlated with the temperature of the NOx catalyst through measurement or estimation;
        switch an execution mode of the control of reducing agent addition quantity based on the obtained catalyst temperature or the temperature information;
        calculate a basic value of the reducing agent addition quantity, which is added by the reducing agent adding unit, based on NOx quantity introduced into the NOx catalyst at each time; and
        calculate a correction value of the reducing agent addition quantity, which is added by the reducing agent adding unit, based on reducing agent adsorption quantity, wherein
    the addition quantity control is performed based on an addition quantity control value calculated from the basic value and the correction value of the reducing agent addition quantity in a case where the catalyst temperature or the temperature information is lower than a predetermined value,
    the addition quantity control is performed based on an addition quantity control value calculated from the basic value in a case where the catalyst temperature or the temperature information is higher than a predetermined value, and
    wherein the exhaust gas purification device calculates the reducing agent adsorption quantity in the NOx catalyst and controls the reducing agent addition quantity, which is added by the reducing agent adding unit, based on the reducing agent adsorption quantity.

2. The exhaust gas purification device as in claim 1, wherein
    the addition quantity control is stopped based on the reducing agent adsorption quantity in a case where the obtained catalyst temperature or the temperature information is higher than a predetermined value.

3. The exhaust gas purification device as in claim 1, wherein
    the reducing agent addition control is switched between first control performed based on the reducing agent adsorption quantity and second control performed not based on the reducing agent adsorption quantity, and
    hysteresis is provided between a catalyst temperature threshold value in the case of switching from the first control to the second control and a catalyst temperature threshold value in the case of switching from the second control to the first control.

4. The exhaust gas purification device as in claim 1, wherein
    the exhaust gas purification device performs feedback control of the reducing agent addition quantity to conform the reducing agent adsorption quantity to a target value, and
    at least one of a gain of the feedback control and an upper limit of a feedback amount of the feedback control is changed based on the obtained catalyst temperature or the temperature information.

5. The exhaust gas purification device as in claim 1, wherein
load information of the internal combustion engine is obtained as the temperature information, and
the execution mode of the reducing agent addition control is switched based on the load information of the internal combustion engine.

6. The exhaust gas purification device as in claim 1, wherein:
the reducing agent adsorption quantity is initialized in a case where the catalyst temperature or the temperature information is indicative of reaching a predetermined high temperature range.

7. The exhaust gas purification device as in claim 6, wherein
the reducing agent adsorption quantity is initialized to zero or a value close to zero in the case where the catalyst temperature or the temperature information is indicative of reaching the predetermined high temperature range.

8. The exhaust gas purification device as in claim 6, wherein:
the electronic control unit is further configured to calculate a limit value of the reducing agent adsorption quantity based on a relationship between the catalyst temperature and the limit value of the reducing agent adsorption quantity of the NOx catalyst, and
the reducing agent adsorption quantity is initialized with the limit value of the reducing agent adsorption quantity in the case where the catalyst temperature or the temperature information is indicative of reaching the predetermined high temperature range.

9. An exhaust gas purification device of an internal combustion engine applied to an exhaust gas purification system that has a NOx catalyst provided in an exhaust passage of the internal combustion engine for adsorbing a reducing agent and for selectively purifying NOx in exhaust gas with the reducing agent and that adds the reducing agent upstream of the NOx catalyst with respect to a flow direction of the exhaust gas by using a reducing agent adding unit, the exhaust gas purification device comprising:
an electronic control unit configured to:
obtain temperature of the NOx catalyst or temperature information correlated with the temperature of the NOx catalyst through measurement or estimation;
switch an execution mode of the control of reducing agent addition quantity based on the obtained catalyst temperature or the temperature information;
calculate a NOx purification rate in the NOx catalyst; and
control the reducing agent addition quantity, which is added by the reducing agent adding unit, based on the calculated NOx purification rate, wherein
the addition quantity control is switched therefrom based on reducing agent adsorption quantity to the addition quantity control based on the NOx purification rate in a case where the catalyst temperature or the temperature information is higher than a predetermined value, and
wherein the exhaust gas purification device calculates reducing agent adsorption quantity in the NOx catalyst and controls reducing agent addition quantity, which is added by the reducing agent adding unit, based on the reducing agent adsorption quantity.

10. The exhaust gas purification device as in claim 9, wherein
the addition quantity control is stopped based on the reducing agent adsorption quantity in a case where the obtained catalyst temperature or the temperature information is higher than a predetermined value.

11. The exhaust gas purification device as in claim 9, wherein
the reducing agent addition control is switched between first control performed based on the reducing agent adsorption quantity and second control performed not based on the reducing agent adsorption quantity, and
hysteresis is provided between a catalyst temperature threshold value in the case of switching from the first control to the second control and a catalyst temperature threshold value in the case of switching from the second control to the first control.

12. The exhaust gas purification device as in claim 9, wherein
the exhaust gas purification device performs feedback control of the reducing agent addition quantity to conform the reducing agent adsorption quantity to a target value, and
at least one of a gain of the feedback control and an upper limit of a feedback amount of the feedback control is changed based on the obtained catalyst temperature or the temperature information.

13. The exhaust gas purification device as in claim 9, wherein
load information of the internal combustion engine is obtained as the temperature information, and
the execution mode of the reducing agent addition control is switched based on the load information of the internal combustion engine.

14. The exhaust gas purification device as in claim 9, further comprising:
the reducing agent adsorption quantity is initialized in a case where the catalyst temperature or the temperature information is indicative of reaching a predetermined high temperature range.

15. The exhaust gas purification device as in claim 14, wherein
the reducing agent adsorption quantity is initialized to zero or a value close to zero in the case where the catalyst temperature or the temperature information is indicative of reaching the predetermined high temperature range.

16. The exhaust gas purification device as in claim 14, wherein:
the electronic control unit is further configured to calculate a limit value of the reducing agent adsorption quantity based on a relationship between the catalyst temperature and the limit value of the reducing agent adsorption quantity of the NOx catalyst, and
the reducing agent adsorption quantity is initialized with the limit value of the reducing agent adsorption quantity in the case where the catalyst temperature or the temperature information is indicative of reaching the predetermined high temperature range.

* * * * *